US008847566B2

(12) United States Patent
Sasaki et al.

(10) Patent No.: US 8,847,566 B2
(45) Date of Patent: Sep. 30, 2014

(54) SWITCHING POWER SUPPLY WITH MODE TRANSITION CONTROL (75) Inventors: Masahiro Sasaki, Matsumoto (JP); Tetsuya Kawashima, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 606 days.

(21) Appl. No.: 12/662,695

(22) Filed: Apr. 28, 2010

(65) Prior Publication Data
US 2010/0270989 A1   Oct. 28, 2010

(30) Foreign Application Priority Data
Apr. 28, 2009   (JP) .................................. 2009-109120

(51) Int. Cl.
G05F 1/00       (2006.01)
H02M 3/158     (2006.01)
H02M 3/157     (2006.01)

(52) U.S. Cl.
CPC ............ *H02M 3/157* (2013.01); *H02M 3/1588* (2013.01); *Y02B 70/1466* (2013.01)
USPC ........................................................ 323/283

(58) Field of Classification Search
USPC .................. 323/234, 259, 282–285, 344, 345
See application file for complete search history.

(56) References Cited

U.S. PATENT DOCUMENTS

| | | | |
|---|---|---|---|
| 5,237,244 A * | 8/1993 | Bertenshaw et al. .......... | 315/291 |
| 6,252,384 B1 * | 6/2001 | Arai et al. ..................... | 323/282 |
| 7,483,453 B2 * | 1/2009 | Diffily et al. .................... | 372/18 |
| 7,902,771 B2 * | 3/2011 | Shteynberg et al. .......... | 315/307 |
| 7,952,294 B2 * | 5/2011 | Shteynberg et al. .......... | 315/224 |
| 2004/0189264 A1 | 9/2004 | Matsuura et al. | |
| 2005/0151518 A1 * | 7/2005 | Schneiker et al. ............ | 323/222 |
| 2007/0210777 A1 * | 9/2007 | Cervera et al. ................ | 323/284 |
| 2008/0084721 A1 * | 4/2008 | Miramonti et al. ............ | 363/89 |
| 2008/0205104 A1 * | 8/2008 | Lev et al. ....................... | 363/98 |

(Continued)

FOREIGN PATENT DOCUMENTS

| | | |
|---|---|---|
| JP | 2004-304873 A | 10/2004 |
| JP | 2004-304961 A | 10/2004 |

OTHER PUBLICATIONS

Guang Feng et al., "A New Digital Control Algorithm to Achieve Optimal Dynamic Performance in DC-to-DC Converters" IEEE, pp. 2744-2749, 2005.

(Continued)

*Primary Examiner* — Adolf Berhane
*Assistant Examiner* — Henry Lee, III
(74) *Attorney, Agent, or Firm* — Rabin & Berdo, P.C.

(57) ABSTRACT

A switching power supply that can suppress output variation at a time of transition of a control mode from a non-linear control mode to a linear control mode. The switching power supply includes instruction value forming circuitry that forms, in a linear control mode, a linear control instruction value for linearly control a switching circuit based on an error of an output voltage, and forms, in a non-linear control mode, a non-linear control instruction value for non-linearly control the switching circuit. The instruction value forming circuitry predicts, in the non-linear control mode, a linear control instruction value suited to the load current in the non-linear control mode, and uses the predicted linear control instruction value for an initial value of the linear control instruction value at a time of transition from the non-linear control mode to the linear control mode.

16 Claims, 9 Drawing Sheets

(56) References Cited

U.S. PATENT DOCUMENTS

2009/0072805 A1* 3/2009 Yamada ............... 323/283
2009/0310385 A1* 12/2009 Maksimovic et al. ....... 363/21.1
2010/0064124 A1* 3/2010 Rinne et al. ............... 713/1

OTHER PUBLICATIONS

Guang Feng et al., "High Performance Digital Control Algorithms for DC-DC Converters Based on the Principle of Capacitor Charge Balance" 37th IEEE Power Electronics Specialists Conference, pp. 1740-1746, 2006.

Eric Meyer et al., "A Quick Capacitor Charge Balance Control Method to Achieve Optimal Dynamic Response for Buck Converters" IEEE, pp. 1549-1555, 2007.

Zhenyu Zhao et al., "Continuous-Time Digital Signal Processing Based Controller for High-Frequency DC-DC Converters" IEEE, pp. 882-886, 2007.

* cited by examiner

SWITCHING POWER SUPPLY WITH MODE TRANSITION CONTROL

CROSS-REFERENCE TO RELATED APPLICATION

This application is based on, and claims priority to, Japanese Patent Application No. 2009-109120, filed on Apr. 28, 2009, the content of which is incorporated herein by reference in its entirety.

BACKGROUND OF THE INVENTION

1. Field of the Invention

The present invention relates to a switching power supply, in particular, to a technology in which a linear control instruction value to use at a moment of transition of a control mode from a non-linear control mode to a linear control mode is predicted and set based on a load current in the non-linear control mode.

2. Description of the Related Art

The DC-DC type switching power supplies have a function of a power converter for obtaining a desired output power from an input power, and are widely used for power supplies to provide power for various electronic devices. The switching power supplies use switching elements as a means for converting and adjusting the power.

ICs (integrated circuits) that are loads on the power supply have recently developed to become high density and highly integrated owing to fine semiconductor processes, and are making progress to a high function, low voltage and high current. With this trend, demand for voltage accuracy of a power supply has become earnest, thus, requiring a power supply with extremely high accuracy.

A highly functioning IC changes a consuming electric current thereof in a broad range. A power supply connecting to a load of such an IC transiently increases and decreases the output voltage with abrupt decrease and increase, respectively, of the current. Still in such a situation, the value of the output voltage of the power supply must be kept in a permissible range. Thus, the power supply needs quick response to the load variation.

Conventionally, a control section of a DC-DC type switching power supply is composed of an analog circuit and uses a control method of a linear feed-back control such as PID control and PI control. Since the conventional linear control restricts the transient characteristics within a bandwidth of a negative feedback loop, quick transient response can be hardly performed. As a result, the adverse effect of the abrupt current variation is suppressed using a huge decoupling capacitor.

In a condition of low voltage and high current, a voltage applied to the IC may rise exceeding the permissible range because of a voltage drop due to wiring impedance between the power supply and the IC and because of a transient voltage variation due to wiring inductance between the power supply and the IC. In order to suppress this situation, a distributed arrangement system is a main stream in which the power supply is disposed at a close proximity of the load IC.

Since the highly functioning load IC has a multiple of data buses and address buses lead out from the IC, it is undesirable to arrange the power supply with a huge decoupling capacitor at close proximity of the IC. Therefore, the power supply needs to perform sufficient quick load response yet with little external decoupling capacitors.

To satisfy the demand, a number of non-patent documents, such as G. Feng, W. Eberle and Y. Liu "A new digital control algorithm to achieve optimal dynamic performance in DC-DC converters" in Proc. IEEE PESC, 2005, pp. 2744-2748, G. Feng, E. Meyer and Y. Liu "High performance digital control algorithms for DC-DC converters based on the principle of capacitor charge balance" in Proc. IEEE PESC, 2006, pp. 1740-1743, E. Meyer and Y. Liu "A quick capacitor charge balance control method to achieve optimal dynamic response for buck converters" in Proc. IEEE PESC, 2007, pp. 1549-1555, and Z. Zhao, V. Smolyakov and A. Prodic "Continuous-time digital signal processing based controller for high-frequency DC-DC converters" in Proc. IEEE APEC, 2007, pp. 882-886, for example, disclose power supplies employing a non-linear control system based on the capacitor charge balance theory.

The non-linear control system changes the controlling quantity corresponding to variation of a deviation not linearly but non-linearly. The controlling quantity is a duty factor or a PWM pulse width for controlling switching elements in a switching power supply.

Figure 6:
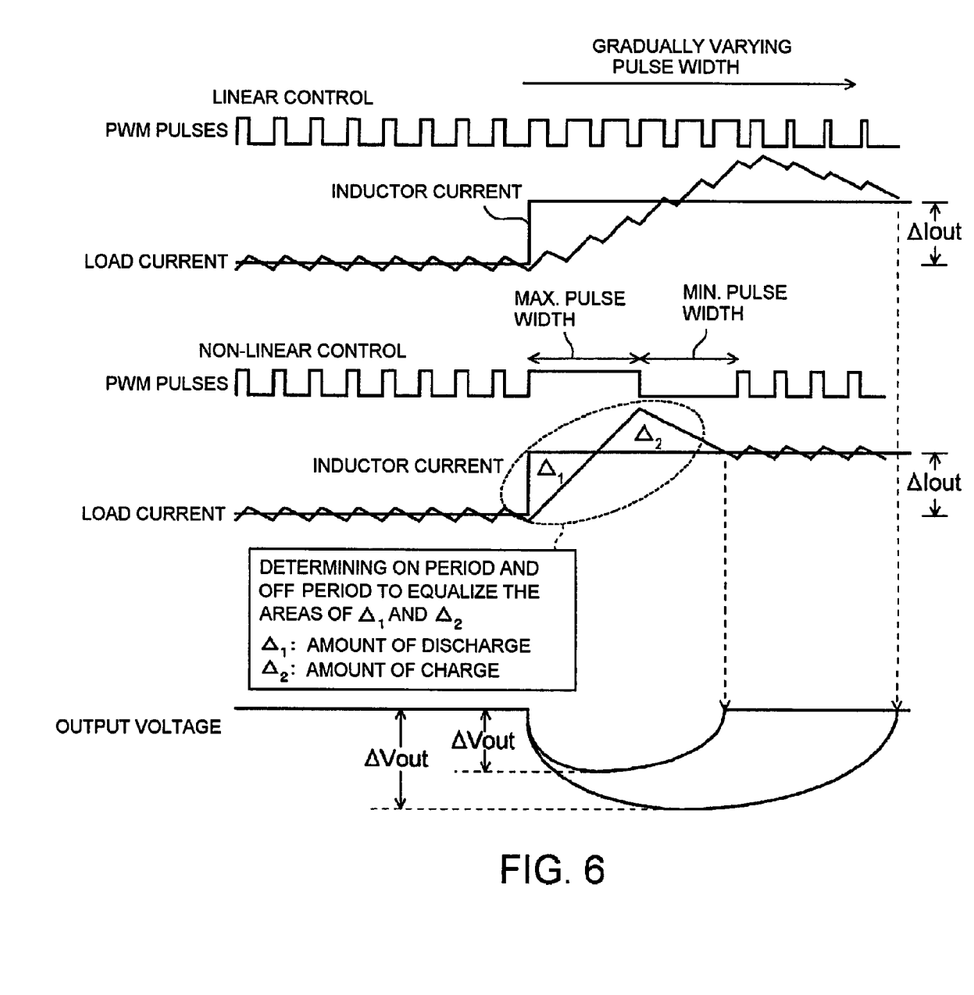
FIG. 6 shows waveforms of varying PWM pulses, inductor current, and output voltage in the transient state both with linear control and with non-linear control.

FIG. 6 shows variation of PWM pulses in a transient period (in a load current varying period) and corresponding variation of the inductor current and the output voltage in the cases of a linear control and a non-linear control.

As shown in the figure, the disclosed power supplies of the non-linear control system operates linearly in the steady state, and in a transient state with voltage variation due to variation of the load current, the control mode is changed over to non-linear control and the power supply operates in the non-linear control scheme.

As described previously, transient characteristics in the linear control mode are restricted within a bandwidth of the feedback loop. Consequently, the controlling quantity (a duty factor or a PWM pulse width) in the linear control mode varies only gradually corresponding to current variation as shown in the figure, resulting in large transient variation of voltage.

On the other hand, the disclosed non-linear control mode gives the maximum controlling quantity (the maximum or minimum PWM pulse width) from the initial moment of the transient period as shown in the figure, allowing control exceeding the bandwidth restriction of the linear control mode. Accordingly, a power supply with good transient performance is obtained. Of the PWM pulses in FIG. 6, the period indicated by "the maximum pulse width" is a pulse of duty factor of 100%, and the period indicated by "the minimum pulse width" is a pulse of duty factor of 0%.

The capacitor charge balance theory mentioned above directs to modeling and analysis of a DC-DC type switching power supply in a steady state, utilizing the condition that the mean value of capacitor current of an output capacitor (flow of charged electric charges or discharged electric charges of the output capacitor) in a single switching period must be zero.

The non-linear control method mentioned above is an expansion of this concept to voltage variation in the transient period. In this non-linear control method, the voltage variation in the transient period is recovered by one time of switching operation as shown in FIG. 6.

To recover a voltage variation in one switching operation, the output voltage must be equal at the start and the end of a switching cycle. For satisfying this condition, an ON period and an OFF period of a PWM pulse are obtained so as to equalize the changed electric charges and the discharged electric charges of the output capacitor, and control is conducted based on those periods. Referring to the waveform in FIG. 6, the control is conducted based on an ON period and an OFF period that equalize the areas Δ1 and Δ2 in FIG. 6. After recovery of the voltage, the control mode is returned to the conventional linear control mode, in which a stable operation is conducted.

The control sections of the power supplies disclosed in the references mentioned above have a construction capable of operating in the both control modes of a linear control mode and a non-linear control mode. Operation is conducted in the linear control mode in the steady state, in the non-linear control mode based on the charge balance theory in the transient state, and again in the linear control mode in the steady state after the end of the transient state. The control section holds, during operation in the non-linear control mode, the controlling quantity (a duty factor or a PWM pulse width) in the steady state at the right before turning into the steady state. Then, operation is conducted again in the linear control mode, using the held controlling quantity to start the linear control.

Patent documents, such as Japanese Unexamined Patent Application Publication No. 2004-304873 and Japanese Unexamined Patent Application Publication No. 2004-304961 disclose other switching power supplies with a digital control scheme having a construction to ensure stable output voltage still in an abrupt change in the load current.

As described above, the control section of the power supplies disclosed in the non-patent documents cited above stores and holds the controlling quantity (a duty factor or a PWM pulse width) in the linear control mode at right before changing over from a linear control mode to a non-linear control mode according to variation of a load current, and is operated to start the linear control again after the operation period of the non-linear control mode using the stored and held controlling quantity just after returning to the linear control mode.

Stating again, the control section stores and holds the controlling quantity in the linearly controlled steady state with a load current before variation, throughout the transient period with a varying load current, and the linear control in the steady state after the transient period is started using the held controlling quantity.

Figure 7:
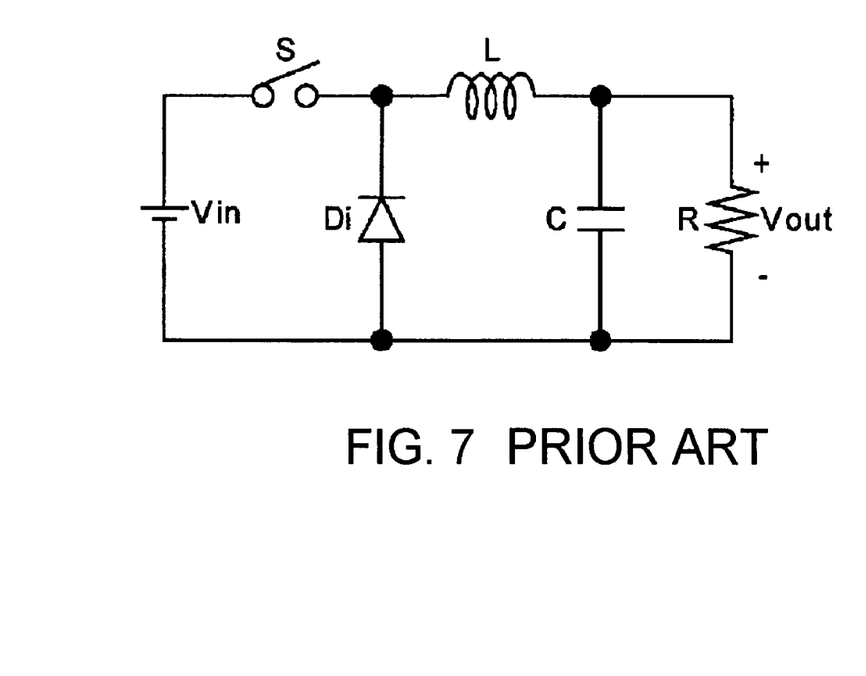
FIG. 7 is a circuit diagram of a conventional example of a step down type DC-DC converter circuit.

A duty factor of a DC-DC type switching power supply is determined by a ratio of an output voltage to an input voltage in an ideal condition. For a step down type DC-DC converter circuit shown in FIG. 7, for example, the duty factor Ds is represented by the following equation (1) using an input voltage Vin and an output voltage Vout in an ideal condition with no resistive component which would be consisted of an on-resistance in the output switch element S (which can be a MOSFET), an equivalent resistance of the inductor L, and a resistance in the wiring.

$$Ds = Vout/Vin \quad (1)$$

This duty factor Ds in the ideal condition is a constant value irrespective of the output current.

In an actual switching power supply, however, due to existence of a loss caused by the resistance component, the duty factor Ds is different from the duty factor in the ideal condition.

In FIG. 7, Di represents a diode, C represents a capacitor, and R represents a load.

Figure 8:
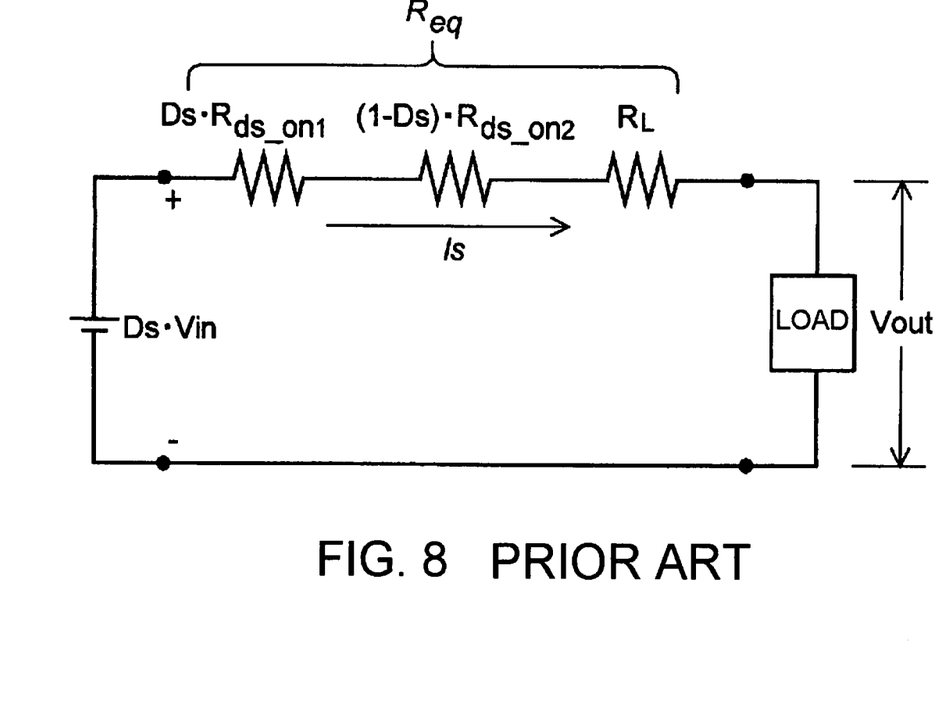
FIG. 8 is a circuit diagram of an equivalent circuit of a step down type DC-DC converter in which resistance components are taken into consideration.

FIG. 8 shows an equivalent circuit of a voltage step down type DC-DC converter (a switching power supply) taking the resistance component into consideration, in particular the equivalent circuit operating at a duty factor Ds in the steady state. In FIG. 8, the on-resistance of the switching element S shown in FIG. 7 is represented by Rds_on1, the on-resistance of the diode Di (or a synchronous rectifying switch replacing the diode Di) is represented by Rds_on2, the equivalent resistance of the inductor L is represented by $R_L$, and the output current (a load current) in the steady state is represented by Is.

Assuming zero values of the resistance Rds_on1, Rds_on2, and $R_L$, the output voltage Vout is represented by the ideal value Ds*Vin based on the relation of equation (1). When the resistances Rds_on1, Rds_on2, and $R_L$ are not zero, the output voltage Vout is decreased by an amount due to a voltage drop caused by the resistances.

The output current Is, a load current, is a mean inductor current averaged over the increasing inductor current running in the inductor L with the switch S ON and the decreasing inductor current running in the inductor L with the switch S OFF.

The mean voltage drop ΔV1 when the switch S is ON and the diode Di is OFF is given by $$\Delta V1 = (Rds\_on1 + R_L)*Is \quad (2)$$

At this time, a relation Ds*Vin−ΔV1=Vout holds.

On the other hand, the mean voltage drop ΔV2 when the switch S is OFF and the diode Di is ON is given by $$\Delta V2 = (Rds\_on2 + R_L)*Is \quad (3)$$

At this time, a relation Ds*V1n−ΔV2=Vout holds.

Therefore, the mean value ΔV of the voltage drop caused by the resistance component averaged over time is given by $$\begin{aligned}\Delta V &= Ds*\Delta V1 + (1-Ds)*\Delta V2 \\ &= [Ds*\text{Rds\_on1} + (1-Ds)*\text{Rds\_on2} + R_L]*Is \\ &= Req*Is\end{aligned} \quad (4)$$

wherein $$Req = Ds*Rds\_on1 + (1-Ds)*Rds\_on2 + R_L$$

As a result, the actual output voltage Vout is given by subtracting the time-averaged value ΔV of voltage drop from the ideal output voltage Ds*Vin.

$$Ds*Vin - \Delta V = Vout \quad (5)$$

The equations (4) and (5) lead to the following equation.

$$Ds*Vin - Req*Is = Vout \quad (6)$$

The equation (6) shows that a desired output voltage Vout is obtained by necessarily setting a rather high value of the ideal output voltage Ds*Vin.

As is apparent from equation (6), an actual duty factor Ds of a switching power supply depends not only on the input voltage Vin and the output voltage Vout but also on the resistance component Req and the output current Is.

The duty factor Ds in the steady state varies depending on the load current Is. This duty factor Ds differs from the duty factor Ds in the ideal condition more greatly in a switching power supply with a larger resistance component including the ON resistance in a MOS switch S and an equivalent resistance of an inductance L.

The duty factor Ds in an ideal condition is constant irrespective of variation of the load current (an output current) Is. However, an actual duty factor Ds varies by an amount of ΔDs due to variation ΔIout of the output current.

$$\Delta Ds = (Req/Vin)*\Delta Iout \quad (7)$$

Thus, the variation ΔDs of the duty factor varies in proportion to the variation ΔIout in the output current. When the load driven by the switching power supply is an IC, the variation ΔDs of the duty factor Ds cannot be disregarded with an increased current in the IC.

Because of the above-described facts, the method of conventional technology in which a controlling quantity to be used at a moment of transition from a transient state to a steady state is a controlling quantity before the current varies, is not desirable because the linear control starts with a controlling quantity different from the optimum controlling quantity after the current is varied. Thus, variation of output voltage occurs caused by the deviation from the optimum controlling quantity.

Figure 9:
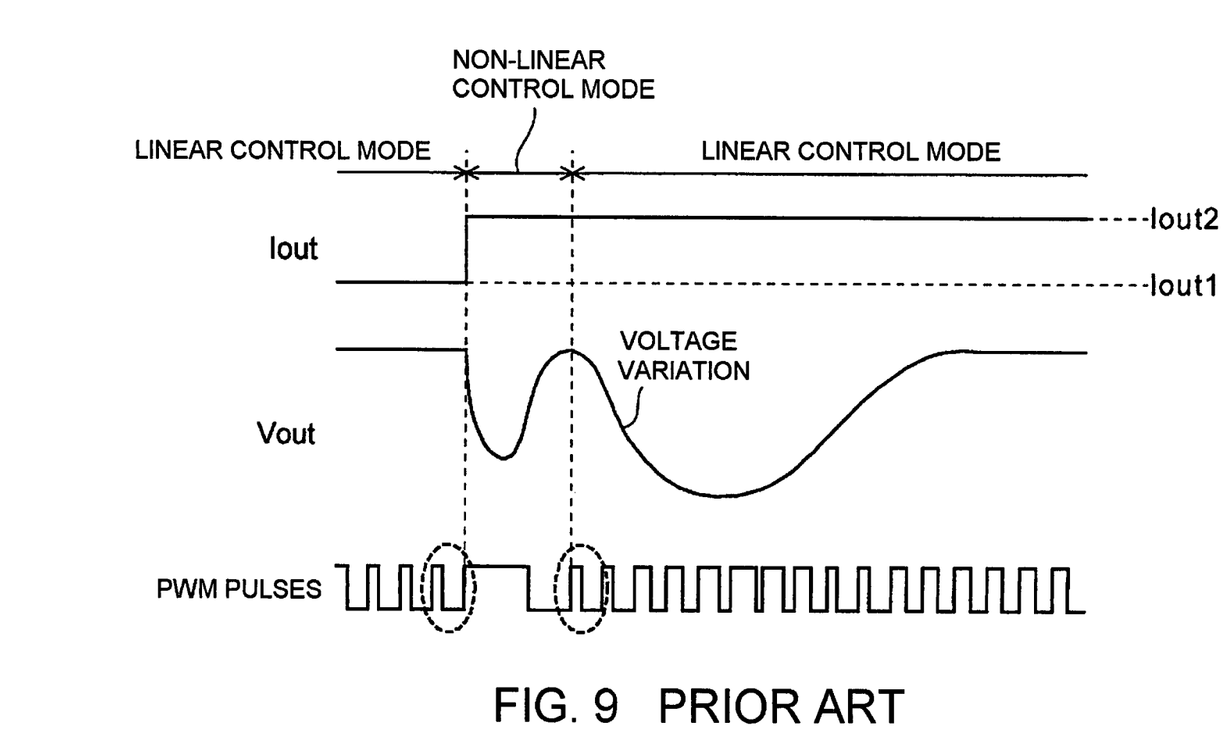
FIG. 9 shows waveforms in the operation of a conventional step down type DC-DC converter circuit.

FIG. 9 shows this situation in which the load current Iout (=Is) increases from Iout1 to Iout2 (Iout1<Iout2). In the period the load current Iout 1 is steadily flowing, the switching power supply is in a steady state and operates in a linear control mode. The duty factor Ds1 in this period is given by the following equation (8) using the resistance component Req as in the case of FIG. 8 based on equation (6).

$$Ds1=(Vout/Vin)+(Req/Vin)*Iout1 \quad (8)$$

When the load current varies from Iout1 to Iout2, the output voltage Vout varies transiently. The control section controls shifting to the non-linear control mode and at the same time stores and holds the duty factor Ds1. When the output voltage Vout recovers the predetermined value owing to the non-linear control, the control section shifts to the linear control mode again and conducts linear control using the held duty factor Ds1. However, the load current at this time is Iout2. The optimum duty factor Ds2 in the period with a steady load current of Iout2 is, $$Ds2=(Vout/Vin)+(Req/Vin)*Iout2 \quad (9)$$

Thus, Ds1<Ds2 in the case of Iout1<Iout2.

The duty factor Ds1 is smaller than the optimum duty factor Ds2 for Iout2. When the control section starts to control using the duty factor Ds1, the output voltage Vout cannot be kept at a predetermined value corresponding to the load current Iout2, and the output voltage Vout begins to vary as shown in FIG. 9. The control section detects the variation and operates aiming the output voltage at the predetermined value of. However, because the operation is conducted by a linear control mode, the transient performance is restricted by the bandwidth of the feedback loop and the large variation occurs in the output voltage Vout.

Although the patent documents cited above disclose a technology to ensure stable output without oscillation irrespective of increased gain of a control loop, the documents are silent about a technology to cope with the variation of the duty time factor (an error in the controlling quantity) due to the load current and the resistance component.

SUMMARY OF THE INVENTION

In view of the circumstances, an object of the present invention is to provide a switching power supply that predicts and sets a linear control instruction value to be employed at a moment of transition of the control mode from a non-linear control mode to a linear control mode corresponding to a load current in the non-linear control mode.

The switching power supply according to the present invention includes: a DC-DC converter section for converting a DC voltage by switching operation of a switching circuit, a current detection means for detecting a load current in the DC-DC converter section: and a digital control section for controlling the switching operation of the switching circuit.

The digital control section includes an error detection means for detecting an error in an output voltage of the DC-DC converter section. A control mode instruction means instructs operation in a linear control mode when the error is substantially zero, and instructs operation in a non-linear control mode when the magnitude of the error is greater than zero. An instruction value forming means forms a linear control instruction value to linearly control the switching circuit based on the error in the linear control mode, and forms a non-linear control instruction value to non-linearly control the switching circuit in the non-linear control mode. The instruction value forming means predicts a linear control instruction value compatible with the load current in the non-linear control mode, and uses the predicted linear control instruction value as an initial value of the linear control instruction value at a transition from the non-linear control mode to the linear control mode. A pulse generation means generates PWM control pulses based on the linear control instruction value and the non-linear control instruction value.

The instruction value forming means can form the non-linear control instruction value based on the capacitor charge balancer theory.

The instruction value forming means can predict the linear control instruction value to be used for the initial values based on a first linear control instruction value when the error in the output voltage is substantially zero and the load current is zero, based on a second linear control instruction value when the error in the output voltage is substantially zero and a constant current is forcably supplied in the DC-DC converter as a dummy load current, the load current in the non-linear control mode, and the constant current of the dummy load current.

The constant current of the dummy load current can be set at 1 A.

The instruction value forming means can store the first linear control instruction value and the second linear control instruction value in a storing means at a starting time of the power supply. Also, each time the control mode instruction means instructs operation in a non-linear control mode, the instruction value forming means can predict the initial value of the linear control instruction value by a calculation using the stored first and second control instruction values, the load current in the non-linear control mode, and the constant current of the dummy load current.

The instruction value forming means can predict a linear control instruction value to be used as the initial value for each of a plurality of predetermined load current values, based on the first linear control instruction value, the second linear control instruction value, the plurality of predetermined load current values used as the load current in the non-linear control mode, and the constant current of the dummy load current. It also can store the plurality of predetermined load current values and the predicted linear control instruction values corresponding to each of the load current values into a look up table, and for each time the control mode instruction means instructs operation in a non-linear control mode, the instruction value forming means can read out the predicted linear control instruction value suited to the load current from the look up table based on the load current in the non-linear control mode.

The switching power supply of the invention can further include a constant current circuit for supplying the constant current of the dummy load current, wherein the control mode instruction means can operate the constant current circuit at a starting time of the power supply, and make the load in the DC-DC converter section in a non-operated state substantially equal to zero.

According to the invention, a linear control instruction value to be employed at a moment of transition of the control mode from a non-linear control mode to a linear control mode is predicted and set corresponding to a load current in the non-linear control mode, suppressing output variation. As a consequence, a switching power supply of the invention provides a quick transient load response and addresses the demand by the load side for extremely high accuracy of a power supply. Since the quick load resonance is obtained without using a huge decoupling capacitor, the packaging area can be reduced. Reliability is improved in a power supply of the invention in which a small number of capacitors are used, since the capacitors are parts that deteriorate over time, causing a malfunction.

BRIEF DESCRIPTION OF THE DRAWINGS

Figure 1:
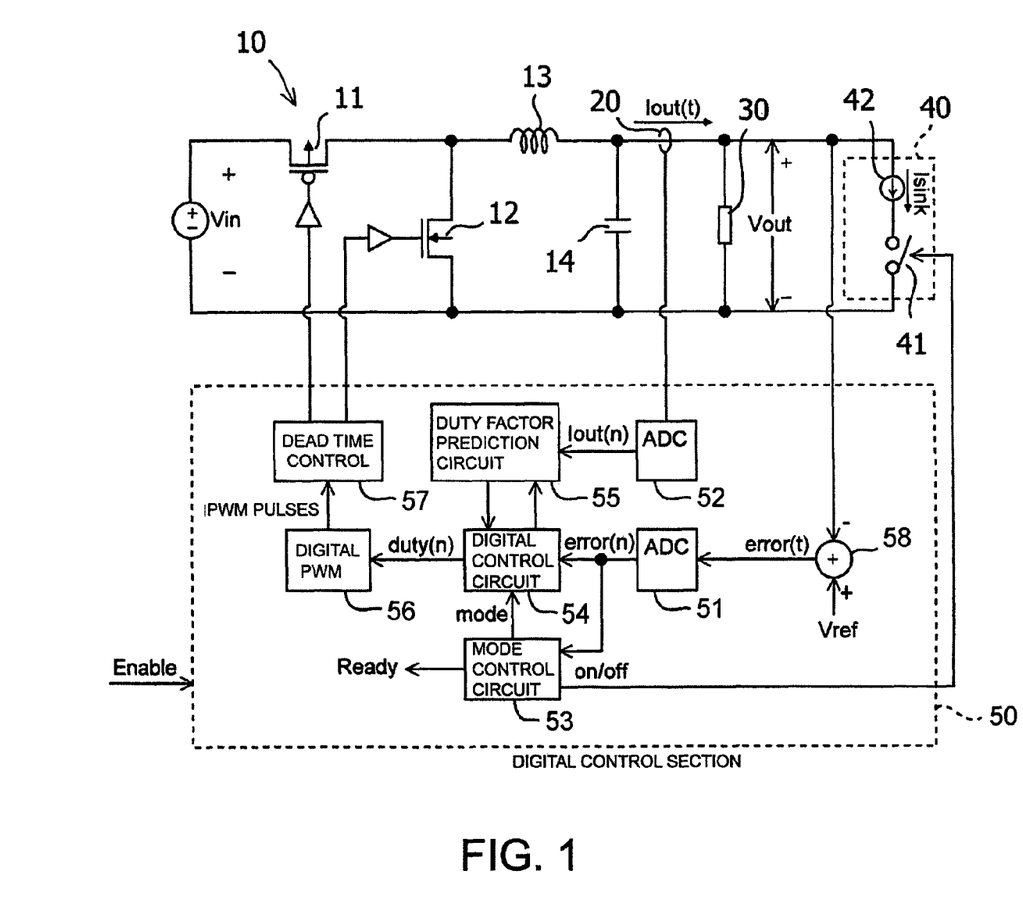
FIG. 1 is a circuit diagram showing an embodiment of a step down type switching power supply according to the invention.

FIG. 1 shows an embodiment of a step down type switching power supply according to the invention.

This switching power supply includes a DC-DC converter section 10, a current detector 20 for detecting an output current Iout (t) of the DC-DC converter section 10, a constant current circuit 40 in parallel connection to a load 30 of the DC-DC converter section 10, an error detection circuit 58, and a control section 50.

The DC-DC converter section 10 includes output switching elements 11 and 12, an inductor 13 and an output capacitor 14. This embodiment uses a P-type MOSFET and an N-type MOSFET for the switching element 11 and the switching element 12, respectively. However, both switching elements 11 and 12 can be composed of N-type MOSFETs.

The constant current circuit 40 includes a switching element 41 controlled by an ON/OFF signal from the control section 50 and a constant current source 42 in series connection to the switching element 41. Although the constant current circuit 40 is disposed within the switching power supply (in a chip) in this embodiment example, the constant current circuit 40 can be disposed outside the switching power supply (external connection) in another embodiment.

The error detection circuit 50 detects the error in the output voltage Vout (a deviation from a reference voltage Vref) and outputs an error signal error (t) corresponding to the error.

The control section 50 includes analog-digital converters (abbreviated to ADCs in the following description) 51 and 52, a mode control circuit 53, a digital control circuit 54, a duty factor prediction circuit 55, a digital PWM circuit 56, and a dead time control circuit 57.

The ADC 51 converts the error signal error (t) outputted from the error detection circuit 50 into a digital error signal error (n). The ADC 52 converts the output current Iout (t) in the DC-DC converter section 10 detected by the current detector 20 into a digital current signal Iout (n).

The mode control circuit 53 outputs a mode signal for selecting a control mode of the whole control section 50. The mode signal can be "Lo" for selecting a linear control mode and "Hi" for selecting a non-linear control mode, for example.

The digital control circuit 54 generates a control signal duty (n) corresponding to the mode signal outputted from the mode control circuit 53.

The duty factor prediction circuit 55 calculates a predicted control signal Ds based on the digital current signal Iout (n) outputted from the ADC 52 and signals indicating duty factors D0 and D' (described later) given out of the digital control circuit 54.

The digital PWM circuit 56 converts the control signal duty (n) outputted from the digital control circuit 54 into PWM pulses of a duty factor corresponding to the control signal duty (n).

The switching power supply of the embodiment example operates in a linear control mode in a steady state in which the current in the load 30 does not vary. The error detection circuit 50 compares the output voltage Vout with the reference voltage Vref and generates an error signal error (t) corresponding to the difference. The error signal error (t)=Vref−Vout is sampled by the ADC 51 and converted to a binary digital error signal error (n). The sampling is conducted at every switching period Ts of the switching elements 11 and 12. The symbol n in the error signal (n) indicates a switching period at the present time.

The control section 50 operating in the linear control mode calculates the control signal duty (n) in the digital control circuit 54 based on the inputted error signal error (n). The control signal duty (n) is calculated using a PID control (a proportional, integral, and derivative control) or a PI control (a proportional and integral control).

The control signal duty (n) calculated in the digital control circuit 54 is inputted into the digital PWM circuit 56, which in turn sequentially generates PWM pulses for controlling the output switching elements 11 and 12 of the DC-DC converter section 10. The PWM control of the output switching elements 11 and 12 is conducted so that the output voltage Vout of the DC-DC converter section 10 coincides with the reference voltage Vref. The dead time control circuit 57 conducts a well-known dead time control process on the PWM pulses.

When the load current abruptly varies and the output voltage Vout transiently varies, the error signal error (t) increases and the digital error signal error (n) also increases.

The mode control circuit 53 monitors the digital error signal error (n). If the digital error signal error (n) varies more than a preset value, the mode control circuit 53 makes a judgment of transient state and variation of the load current. In this case, the mode signal is changed from "Lo" to "Hi" to select a non-linear control mode.

The digital control circuit 54 in the non-linear control mode calculates an ON period and an OFF period based on the charge balance theory obtaining the digital current signal Iout (n) through the duty factor prediction circuit 55, and outputs control signal duty (n)=100% and duty (n)=0% for the ON period and the OFF period, respectively. At the same time, the duty factor prediction circuit 55 predicts the duty factor immediately after the end of the non-linear control corresponding to the digital current signal Iout (n) indicating the load current.

When the output voltage Vout restores a value within a predetermined range through the non-linear control, the mode control circuit 53 makes the control mode return to a linear control mode. (The mode signal returns to "Lo" from "Hi" in this process.). At this time, the digital control circuit 54 begins a linear control using the duty factor predicted by the duty factor prediction circuit 55.

The following describes about duty factor prediction performed by the duty factor prediction circuit 55.

The optimum duty factor Ds for a load current Is is represented by the equation (10) below, which is an equation slightly modified from equation (6).

$$Ds=(Vout/Vin)+(Req/Vin)*Is \quad (10)$$

Here, Vout/Vin is a duty factor at a load current Is of zero A (Is=0). Representing the Vout/Vin by D0, the equation (10) becomes $$Ds=(Req/Vin)*Is+D0 \quad (11)$$

Figure 2:
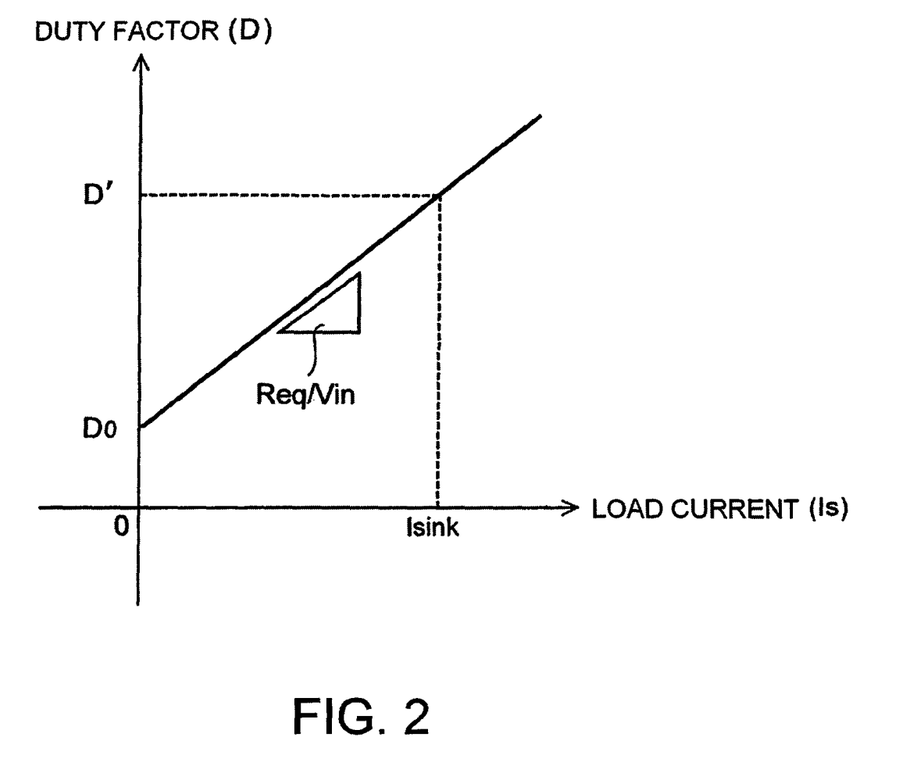
FIG. 2 is a graph showing a relationship between a load current and a duty factor.

The equation (11) represents a straight line with a gradient Req/Vin and an intercept D0, as shown in FIG. 2. Consequently, the optimum duty factor Ds for the load current Is can be obtained from the gradient Req/Vin calculated from the detected Req and Vin. The detection of the resistance component Req is extremely difficult. In addition, detection of both the resistance component Req and the input voltage Vin brings about inconvenience of circuit size expansion.

In this embodiment, the resistance component Req and the input voltage Vin are not detected individually, but the quantity Req/Vin is directly detected by disposing the constant current circuit 40 as shown in FIG. 1.

As is apparent from the relation in FIG. 2, the quantity Req/Vin can be calculated when a duty factor and a load current at any one point on the line are known. The constant current circuit 40 is provided for forcedly supplying a known constant current Isink as a known load current Is. Using the Isink and a duty factor D', the latter being a duty factor in a steady state corresponding to the known constant current Isink, the quantity Req/Vin is represented by $$Req/Vin=(D'-D0)/Isink \quad (12)$$

From the equations (11) and (12), the following relation is obtained.

$$Ds=[(D'-D0)*Is/Isink]+D0 \quad (13)$$

Therefore, the optimum duty factor Ds for a load current Is can be predicted by detecting the duty factor D0 and the duty factor D'.

Figure 3:
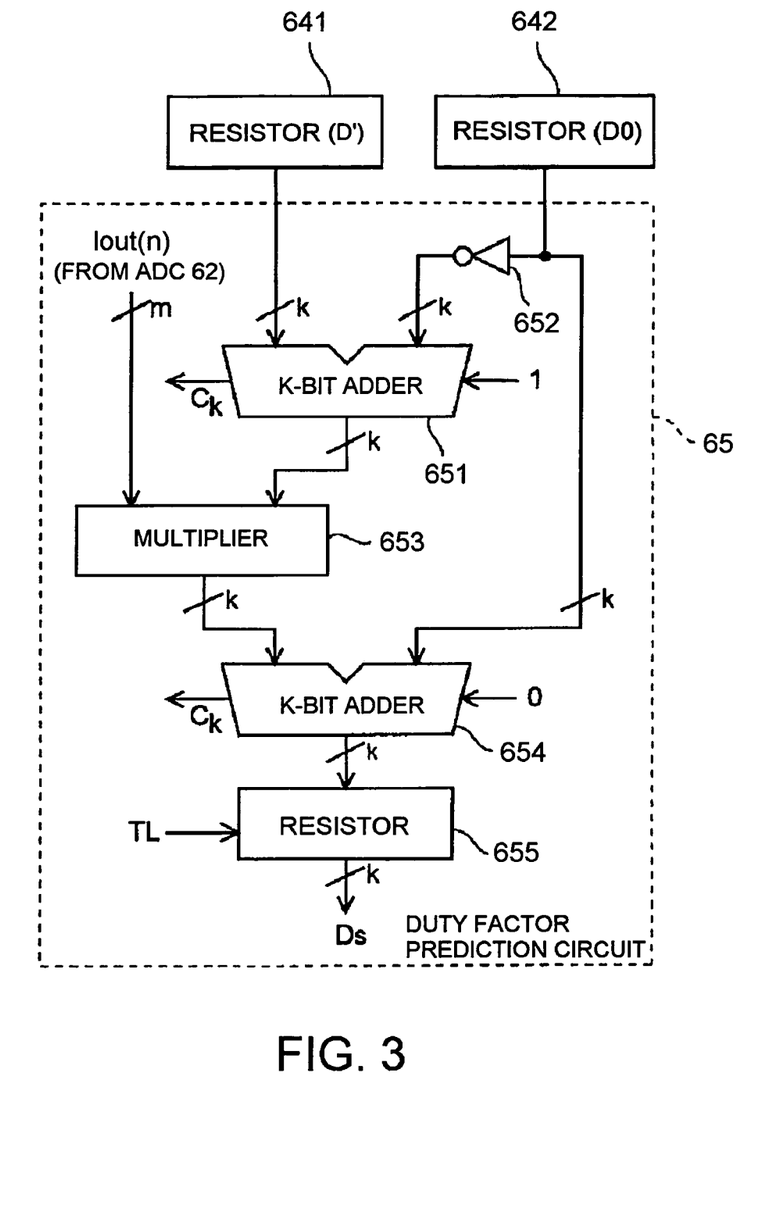
FIG. 3 is a block diagram showing an example of a structure of a duty factor prediction circuit.

For detecting the duty factors D0 and D' to be used in estimation of the optimum duty factor Ds, it is only needed to store the digital signal duty (n) outputted from the digital control circuit 54 operating in a linear control mode into a resistor as described afterwards. Thus, the detection can be achieved without adding any complicated detection circuit. The resistors 641 and 642 shown in FIG. 3 are disposed within the digital control circuit 54 and store the data representing the duty factor D' and D0, respectively.

Setting the Isink for example Isink=0 [A] (which corresponds to the case to inhibit current flow in the load 30 and make the switch 41 in the constant current circuit 40 OFF), and Isink=1 [A] (which corresponds to the case to set the output of the constant current source 42 to be 1 [A] and turn the switch 41 ON while inhibiting current flow in the load 30), the equation (13) reduces to $$Ds=(D'-D0)*Is+D0 \quad (14)$$

In this case, the optimum duty factor Ds can be calculated simply by addition, subtraction, and multiplication. Let DD=D'/Isink and DD0=D0/Isink, so that equation (14) becomes $$Ds=(DD'-DD0)*Is+D0 \quad (15)$$

If DD'=D'/Isink and DD0=D0/Isink have been calculated in the beginning, the optimum duty factor Ds can be calculated only by addition, subtraction, and multiplication.

The duty factor prediction circuit 55 calculates the duty factor Ds based on the equation (13) or the equation (14). Operation of the duty factor prediction circuit 55 can be either of the following two cases.

(1) Every time the control mode is changed over to a non-linear control mode (a transient mode) due to transient variation of the load current Is, a duty factor Ds suited to the load current Is is calculated using the transiently varied load current Is detected by the current detector 20, and the detected duty factors D' and D0.

(2) Duty factors Ds suited to various predetermined load current values Is are preliminarily calculated using the detected duty factors D' and D0, and the calculated duty factors Ds are stored in a look up table (an LUT). A data of a duty factor Ds is read out from the look up table suited for a transiently varied load current Is.

The duty factor prediction circuit 55 is composed of an adder/subtractor and a multiplier in the operation (1), and composed of an adder/subtractor, a multiplier, and the look up table in operation (2). Although the circuit size for the operation (2) is larger than that for the operation (1), the circuit for the operation (2) eliminates calculation processes of the duty factor Ds with every occurrence of transient variation of the load current Is, thus reducing power consumption.

The duty factor prediction circuit 55 can be constructed in an optimum structure corresponding to a specification.

FIG. 3 shows an example of a construction of a duty factor prediction circuit 55 for carrying out the operation (1). This duty factor prediction circuit 55 is constructed based on the equation (14) and includes a subtractor, an adder, a multiplier, and resistors.

The duty factor prediction circuit 55 first executes subtraction D'−D0 using the duty factor D' and D0 stored in the resistors 641 and 642 of the digital control circuit 54. The subtraction operation is executed by a subtractor composed of an adder 651 and an inverter 652. Then, a multiplier 653 executes multiplication of the current signal Iout (n) representing a transiently varied load current Is which is A/D converted by the ADC 52 shown in FIG. 1 and the subtraction result D'−D0 obtained above. After that, the adder 654 executes addition of the multiplication result (D'−D0)*Is and the duty factor D0. The duty factor Ds obtained by the adder 654 is finally stored in a resistor 655 and outputted to the digital control circuit 54 shown in FIG. 1.

The duty factor prediction circuit 55 executing the operation (1) calculates a duty factor Ds suited to a load current Is every time the control mode is changed over to a non-linear control mode (a transient mode) responding transient variation of the load current Is.

In FIG. 3, k represents a bit length of a data indicating the duty factors D' and D0, m represents a bit length of the current signal Iout (n), Ck represents an overflow carry signal of the adders 651 and 654, and TL represents a write timing signal of the resistor 655.

The duty factor prediction circuit 55 executing the operation (2) has a structure disposing the look up table mentioned previously in place of the resistor 655 in the final stage (the resistor 655 stores and outputs the final calculation result Ds) shown in FIG. 3. Since the look up table stores the data of the duty factors Ds corresponding to various values of load current Is, the duty factors D0 suited to the load current values Is can be read out of the look up table based on the transiently varied load current Is and the data stored in the look up table.

As described previously, the digital control circuit 54 in the non-linear control mode outputs control signals duty (n)=100% and duty (n)=0% for the ON period and the OFF period, respectively, determined based on the charge balance theory. When the digital error signal error (n) becomes zero through the non-linear control process, the mode control circuit 53 outputs a mode signal instructing q linear control mode. Accordingly, the digital control circuit 54 receives the duty factor Ds predicted by the duty factor prediction circuit 55 and outputs a linear control instruction signal duty (n) with an initial value of this duty factor Ds. As a result, linear PWM control is conducted with a controlling quantity suited to the transiently varied load current to suppress variation of the output voltage Vout.

After that, the digital control circuit 54 outputs linear control instruction signal duty (n) for the PID control or the PI control obtained based on the digital error signal error (n). After transition to another non-linear control mode, and when transition from a non-linear control mode to a linear control mode occurs again, the digital control circuit 54 outputs a linear control instruction signal duty (n) with an initial value of duty factor Ds predicted by the duty factor prediction circuit 55 at the beginning of the linear control process just like the above described procedure.

Figure 4:
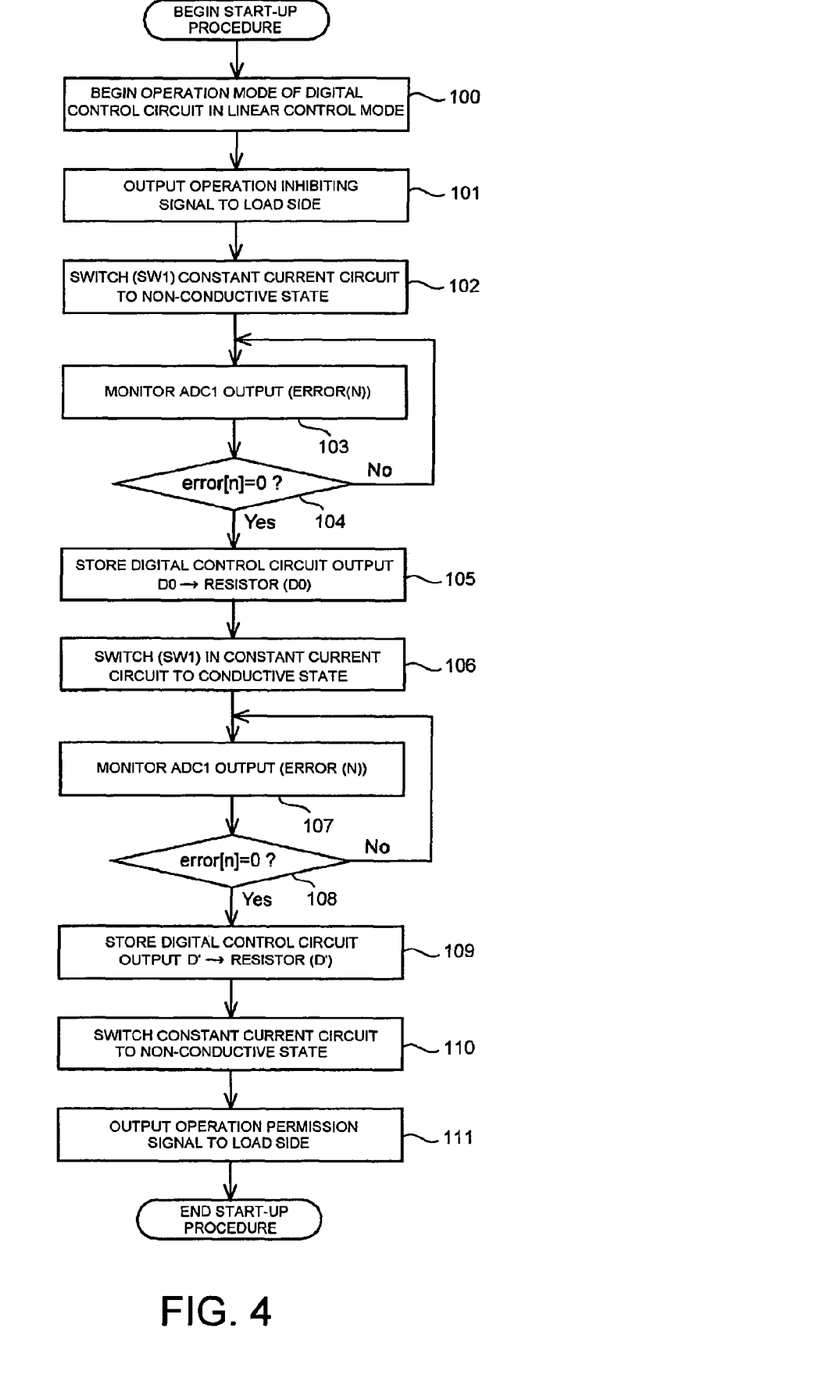
FIG. 4 is a flow chart showing a procedure for detecting a duty factor used to predict the optimum duty factor at the moment of starting linear control.

The following describes a procedure for detecting the duty factors D' and D0. FIG. 4 shows an example of the procedure for detecting the duty factors D' and D0. This procedure is carried out at the start up of operation of the switching power supply.

When the switching power supply is started (by changing the enable signal from "Lo" to "Hi", for example), the mode control circuit 53 makes the operation mode of the digital control circuit 54 fixed to a linear control mode and outputs an operation inhibiting signal (for example, Ready="Lo") to the load 30, and further outputs a signal (the signal can be ON/OFF="Lo", for example) to make the switching element 41 in the constant current circuit 40 into a non-conductive state (in steps 100 through 102).

After the above-described process, the load current Is becomes 0 A. The output voltage Vout of the started switching power supply is gradually increased by the output from the digital control circuit 54 based on the digital error signal error (n) and rises to the predetermined reference voltage Vref. Since both the duty factors D' and D0 are those in a steady state, a steady state must be recognized in order to detect the duty factor D' and D0.

The ADC 51 conducts AD conversion of the error of the output voltage Vout from the reference voltage Vref. Consequently, an output value "0" of the ADC 51 means that there is no error and the power supply is in a steady state, because a steady state without transient variation of the load current does not cause variation of output voltage Vout due to the transient variation.

The digital control circuit 54 monitors the error (n), which is an output signal from the ADC 51 (in step 103). A steady state is recognized based on detection of "0" of the error signal error (n) (in step 104). At the same time of the steady state recognition, the output duty (n) is stored in the resistor 642 shown in FIG. 3 as a duty factor D0 for the load current of zero A (in step 105).

After the digital control circuit finish storing the duty factor D0, the mode control circuit 53 turns the switching element 41 in the constant current circuit 40 into a conductive state (ON/OFF="Hi") forcedly supplying a constant current Isink (in step 106). Here, Isink=1 [A] is supplied.

After that, the digital control circuit 54 again monitors the output signal error (n) from the ADC 51 (in step 107), and recognizes a steady state based on detection of "0" value of the signal error (n) (in step 108). At the time of recognizing the steady state, the digital control circuit 54 stores the output duty (n) into the resistor 641 shown in FIG. 3 as the duty factor D' of a load current of 1 [A] (in step 109).

After storage of the duty factor D' is completed, the mode control circuit 53 turns again the switching element 41 in the constant current circuit 40 into a non-conductive state and outputs an operation permissible signal (Ready="Hi", for example) to the load 30 (in steps 110 and 111). The load 30 is an electronic circuit including a microprocessor, for example. The mode control circuit 53 instructs permission or inhibition of the load 30 based on the Ready signal. In the operation-inhibited state, the load current in the DC-DC converter is zero.

Concerning detection of "0" value of the signal error (n) in steps 104 and 108, if the error (n) is anticipated not necessarily to become "0" due to a quantized error in the ADC 51 or other reason, the error (n) can be considered as substantially "0" when error (n)<$\delta$, where $\delta$ is a small constant.

If the error signal error (t) converges accompanying oscillation in the transition of states of the switching power supply, the error (n) can be considered substantially "0" when the state of error (n)="0" or error (n)<$\delta$ is detected at predetermined number of times.

The criterion for considering the error (n) to be substantially "0" can be applied to determine the end of the non-linear control process.

Figure 5:
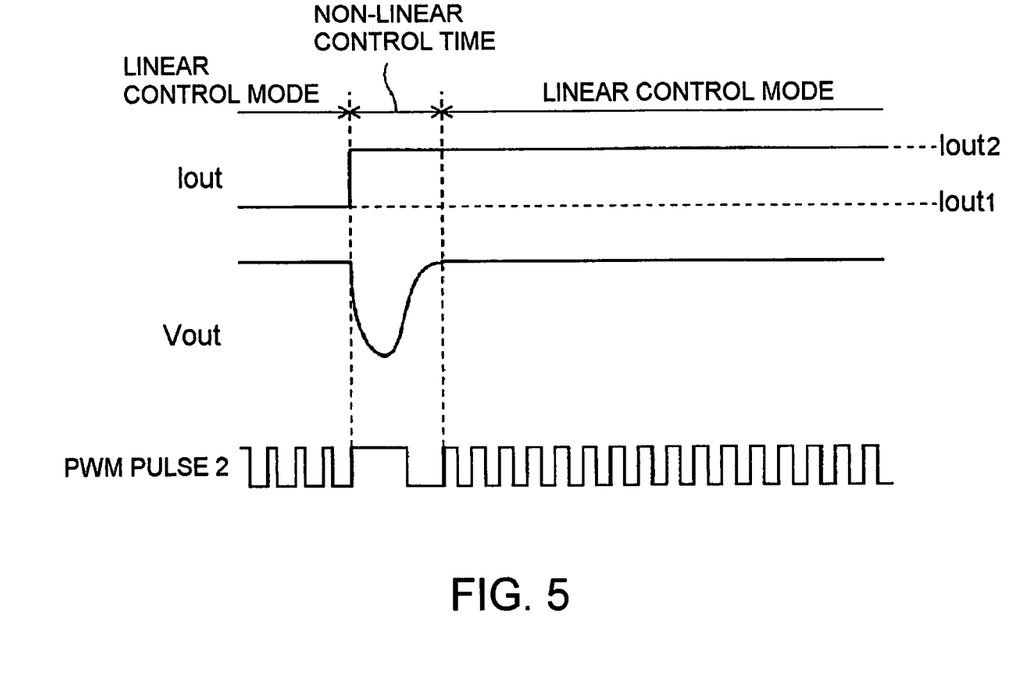
FIG. 5 shows waveforms in the operation of a step down type switching power supply according to the invention.

As described thus far, in the embodiment according to the invention, a linear control instruction value to be employed at a moment of transition of the control mode from a non-linear control mode to a linear control mode is predicted and set corresponding to a load current in the non-linear control mode, suppressing output variation. Therefore, a switching power supply is achieved exhibiting quick transient response as shown in FIG. 5.

What is claimed is:

1. A switching power supply, comprising:
    a DC-DC converter section for converting a DC voltage by a switching operation of a switching circuit;
    a current detection means for detecting a load current in the DC-DC converter section; and
    a digital control section for controlling the switching operation of the switching circuit, the digital control section including
    an error detection means for detecting an error in an output voltage of the DC-DC converter section,
    a control mode instruction means for instructing operation in a linear control mode when the error is substantially zero, and instructing operation in a non-linear control mode when the error is nonzero,
    an instruction value forming means for forming a linear control instruction value to linearly control the switching circuit based on the error in the linear control mode, and forming a non-linear control instruction value to non-linearly control the switching circuit in the non-linear control mode, the instruction value forming means predicting a linear control instruction value compatible with the load current in the non-linear control mode, and using the predicted linear control instruction value as an initial value of the linear control instruction value at a transition from the non-linear control mode to the linear control mode, and
    a pulse generation means for generating PWM control pulses based on the linear control instruction value and the non-linear control instruction value, to control the switching operation of the switching circuit.

2. The switching power supply according to claim 1, wherein the instruction value forming means forms the non-linear control instruction value based on a capacitor charge balance theory.

3. The switching power supply according to claim 1, wherein the instruction value forming means predicts the linear control instruction value to be used for the initial value based on
 a first linear control instruction value when the error in the output voltage is substantially zero and the load current is zero;
 a second linear control instruction value when the error in the output voltage is substantially zero and a constant current is forcedly supplied in the DC-DC converter as a dummy load current;
 the load current in the non-linear control mode; and
 the constant current of the dummy load current.

4. The switching power supply according to claim 3, wherein the constant current of the dummy load current is set at 1 A.

5. The switching power supply according to claim 3, wherein the instruction value forming means
 predicts a linear control instruction value to be used as the initial value for each of a plurality of predetermined load current values based on the first linear control instruction value, the second linear control instruction value, the plurality of predetermined load current values used as the load current in the non-linear control mode, and the constant current of the dummy load current;
 stores the plurality of predetermined load current values and the predicted linear control instruction values corresponding to each of the load current values into a look up table; and for each time the control mode instruction means instructs operation in a non-linear control mode, reads out the predicted linear control instruction value suited to the load current from the look up table based on the load current in the non-linear control mode.

6. The switching power supply according to claim 3, wherein the instruction value forming means stores the first linear control instruction value and the second linear control instruction value in a storing means at a starting time of the power supply, and for each time the control mode instruction means instructs operation in a non-linear control mode, predicts the initial value of the linear control instruction value using the stored first and second control instruction values, the load current in the non-linear control mode, and the constant current of the dummy load current.

7. The switching power supply according to claim 6, further comprising a constant current circuit for supplying the constant current of the dummy load current,
 wherein the control mode instruction means operates the constant current circuit at a starting time of the power supply, and makes the load in the DC-DC converter section in a non-operated state substantially equal to zero.

8. A switching power supply, comprising:
 a switching circuit;
 a DC-DC converter configured to convert a DC voltage by a switching operation of the switching circuit;
 a current detector configured to detect a load current in the DC-DC converter; and
 digital control section configured to control the switching operation of the switching circuit, the digital control section including an error detection circuit configured to detect an error in an output voltage of the DC-DC converter,
a mode control circuit configured to instruct operation in a linear control mode when the error is substantially zero, and instructing operation in a non-linear control mode when the error is nonzero,
an instruction value forming means for forming a linear control instruction value to linearly control the switching circuit based on the error in the linear control mode, and forming a non-linear control instruction value to non-linearly control the switching circuit in the non-linear control mode, the instruction value forming means predicting a linear control instruction value compatible with the load current in the non-linear control mode, and using the predicted linear control instruction value as an initial value of the linear control instruction value at a transition from the non-linear control mode to the linear control mode, and
a pulse generator coupled to the switching circuit and configured to generate PWM control pulses, based on the linear control instruction value and the non-linear control instruction value, for control of the switching circuit operation.

9. The switching power supply according to claim 8, wherein the instruction value forming means forms the non-linear control instruction value based on a capacitor charge balance theory.

10. The switching power supply according to claim 8, wherein the instruction value forming means predicts the linear control instruction value to be used for the initial value based on
 a first linear control instruction value when the error in the output voltage is substantially zero and the load current is zero;
 a second linear control instruction value when the error in the output voltage is substantially zero and a constant current is forcibly supplied in the DC-DC converter as a dummy load current;
 the load current in the non-linear control mode; and the constant current of the dummy load current.

11. The switching power supply according to claim 10, wherein the constant current of the dummy load current is set at 1 A.

12. The switching power supply according to claim 10, wherein the instruction value forming means
 predicts a linear control instruction value to be used as the initial value for each of a plurality of predetermined load current values based on the first linear control instruction value, the second linear control instruction value, the plurality of predetermined load current values used as the load current in the non-linear control mode, and the constant current of the dummy load current;
 stores the plurality of predetermined load current values and the predicted linear control instruction values corresponding to each of the load current values into a look up table; and
 for each time the mode control circuit instructs operation in a non-linear control mode, reads out the predicted linear control instruction value suited to the load current from the look up table based on the load current in the non-linear control mode.

13. The switching power supply according to claim 10, wherein the instruction value forming means stores the first linear control instruction value and the second linear control instruction value at a starting time of the power supply, and for each time the control mode instruction means instructs operation in a non-linear control mode, predicts the initial value of the linear control instruction value using the stored first and second control instruction values, the load current in the non-linear control mode, and the constant current of the dummy load current.

14. The switching power supply according to claim 13, further comprising a constant current circuit for supplying the constant current of the dummy load current, wherein
the mode control circuit operates the constant current circuit at a starting time of the power supply, and makes the load in the DC-DC converter in a non-operated state substantially equal to zero.

15. The switching power supply according to claim 8, wherein the instruction value forming means comprises
a digital control circuit generating a control signal duty corresponding to the operation instructed by the mode control circuit, the control signal duty being output to the pulse generator, and
a duty factor prediction circuit calculating a predicted control signal based on the control signal duty and an output of the DC-DC converter, the predicted control signal being output to the digital control circuit.

16. The switching power supply of claim 1, wherein the digital control section comprises a duty factor prediction circuit configured to determine a duty factor for a transient variation of the load current, the duty factor prediction circuit configured to perform operations on values corresponding to a duty factor at a load current of substantially zero and a duty factor based on a proportion of a resistance component to an input voltage.

* * * * *